United States Patent [19]

Grant

[11] Patent Number: 5,045,113

[45] Date of Patent: Sep. 3, 1991

[54] WAX POLISH

[76] Inventor: Cleavance W. Grant, 37 Geary Rd., Dollis Hill, London, United Kingdom, NW10 1HJ

[21] Appl. No.: 464,448

[22] Filed: Jan. 12, 1990

[51] Int. Cl.$^5$ .......................... C09B 1/08; C08L 91/06
[52] U.S. Cl. ...................................... 106/10; 106/270
[58] Field of Search ............................. 106/3, 10, 270

[56] References Cited

U.S. PATENT DOCUMENTS

| 116,533 | 7/1871 | Bailey | 106/10 |
| 133,917 | 12/1872 | Birch | 106/3 |
| 746,760 | 12/1903 | Studd | 106/10 |
| 1,219,060 | 3/1917 | Williams | 106/3 |
| 1,678,815 | 7/1928 | Katayama | 106/3 |

FOREIGN PATENT DOCUMENTS 1362080  7/1974  United Kingdom .

OTHER PUBLICATIONS

CA97(2):10878j, Molding Compositions, Nov. 1980 (Abstract).

Primary Examiner—Mark L. Bell
Assistant Examiner—Helene Klemanski
Attorney, Agent, or Firm—Blodgett & Blodgett

[57]  ABSTRACT

A wax polish comprises a wax, e.g. beeswax, turpentine and/or white spirit, and alum. The polish may also comprise a vegetable or mineral oil, acetic acid, resin and/or blue stone.

8 Claims, No Drawings

WAX POLISH

BACKGROUND OF THE INVENTION

Existing wax polishes usually comprise beeswax and turpentine or white spirit, in some cases with the addition of a small amount of acetic acid.

SUMMARY OF THE INVENTION

The present invention seeks to provide an improved wax polish.

According to the present invention there is provided a wax polish comprising a wax, turpentine and/or white spirit, and alum.

As is known alum is a compound which is one of a large number of isomorphous compounds of general formula:

$$R^1R^{111}(SO_4)_2.12H_2O \text{ or}$$
$$R_2^1SO_4.R_2^{111}(SO_4)_3.24H_2O$$

where $R^1$ represents potassium, sodium, ammonium, rubidium, caesium, silver, thallium and $R^{111}$ represents aluminium, iron, chromium, manganese, thallium. The preferred alum is potassium aluminium sulphate, also known as alum potash sulphate.

The wax is preferably beeswax. The polish preferably also comprises a vegetable oil, e.g. cedar oil or teak oil, or a mineral oil, e.g. white oil; it is believed that such an oil enhances the effect of the alum. The polish may also comprise acetic acid. Preferred embodiments also comprise resin and/or blue stone.

A wax composition comprising finely-ground aluminium sulphate is disclosed in British Patent 1362080. However, the composition is fibrous and is for improving the water repellant properties of board; accordingly the composition is not employable as a polish.

DESCRIPTION OF THE PREFERRED EMBODIMENTS

Preferred embodiments of the invention will now be described, by way of example only. A first preferred formula is as follows, the percentages being by weight:

| EXAMPLE 1 | |
| --- | --- |
| 1. Pure Turpentine | 66% |
| 2. Pure Beeswax | 25% |
| 3. Alum | 5% |
| 4. Resin | 2% |
| 5. Acetic Acid | 1% |
| 6. White Oil | 0.5% |
| 7. Blue Stone | 0.5% |
| | 100% |

It is not essential that the turpentine and beeswax are pure, but this is preferred. The composition may vary within the following ranges:
 1. Turpentine 53%-77%
 2. Beeswax 20%-30%
 3. Alum 3%-10%
 4. Resin 0%-3%
 5. Acetic Acid 0%-1%
 6. White Oil 0%-2%
 7. Blue Stone 0%-1%

A second preferred formula is:

| EXAMPLE 2 | |
| --- | --- |
| 1. Pure Turpentine | 69% |
| 2. Pure Beeswax | 25% |
| 3. Alum | 5% |
| 4. White Oil | 0.5% |
| 5. Acetic Acid | 0.5% |
| | 100% |

The composition may vary within the following ranges:
 1. Turpentine 57%-77%
 2. Beeswax 20%-30%
 3. Alum 3%-10%
 4. White Oil 0%-2%
 5. Acetic Acid 0%-1%

The above compositions have a number of advantages. They are particular advantageous for use in restoring antique furniture. Instead of the long and messy procedure of french polishing followed by the application of a conventional wax polish, a quick single application of one of the above described compositions is sufficient to provide an excellent patina. A uniform result without smears is obtained and the grain is shown in a particularly attractive manner. The above compositions have no unpleasant smell, in fact little smell at all. They are easy to apply and are not readily absorbed by the wood, as with some existing polishes.

The polish may be used for all normal purposes. It can be used on all types of furniture and may incorporate a suitable colorant, usually black or brown to hide crevices. Additionally it has proved to be most effective for use on marble, tiles, paintwork (especially for removing embedded dust) chrome articles and for polishing the bodywork of motor vehicles.

The compositions may be provided with a suitable scent if required. Any suitable wax may be used instead of, or in addition to beeswax in which case the total weight of wax corresponds to the weight of beeswax given in the above examples. Similarly white spirit may wholly or partly replace the turpentine and vinegar may wholly or partly replace the acetic acid.

It will be understood that the above description of the present invention is susceptible to various modifications, changes and adaptations.

What is claimed is:

1. A composition for use as a wax polish consisting essentially of the following: wax (20-30 parts by weight), turpentine, white spirit or mixture thereof (53 to 77 parts by weight), and alum (3 to 10 parts by weight).

2. A polish according to claim 1, wherein the wax comprises beeswax.

3. A polish according to claim 1, wherein the wax polish further comprises a vegetable or mineral oil.

4. A polish according to claim 1 further comprising acetic acid.

5. A polish according to claim 1 further comprising resin material.

6. A polish according to claim 1 further comprising blue stone.

7. A composition for use as a wax polish comprising the following percentages, by weight:
 Turpentine or white spirit or mixtures thereof: 53%-77%
 Wax: 20%-30%
 Alum: 3%-10%
 Resin: 0%-3%
 Acetic Acid or vinegar or mixtures thereof: 0%-1%
 White Oil: 0%-2%
 Blue Stone: 0%-1%

8. A composition according to claim 7 wherein the wax is beeswax.